United States Patent [19]

Wehberg

[11] 4,396,083
[45] Aug. 2, 1983

[54] DISCONNECTABLE HYDRAULIC STEERING ASSISTOR

[75] Inventor: Manfred Wehberg, Hagen, Fed. Rep. of Germany

[73] Assignee: O&K Orenstein & Koppel Aktiengesellschaft, Berlin, Fed. Rep. of Germany

[21] Appl. No.: 173,260

[22] Filed: Jul. 29, 1980

[30] Foreign Application Priority Data

Aug. 3, 1979 [DE] Fed. Rep. of Germany ....... 2922541

[51] Int. Cl.³ .............................................. B62D 5/06
[52] U.S. Cl. .................................. 180/133; 180/142; 180/143
[58] Field of Search ............... 180/132, 141, 142, 143, 180/79.1, 133, 65 R

[56] References Cited

U.S. PATENT DOCUMENTS

| | | | |
|---|---|---|---|
| 3,884,318 | 5/1975 | Abels et al. | 180/65 R |
| 4,008,779 | 2/1977 | Shinoda | 180/79.1 |
| 4,056,160 | 11/1977 | Abels et al. | 180/143 |

Primary Examiner—Randolph A. Reese
Assistant Examiner—Donn McGiehan
Attorney, Agent, or Firm—Martin A. Farber

[57] ABSTRACT

A hydraulic steering assistor, which can be switched off, for a vehicle with a hydraulic pump, an electric motor and a relay, which vehicle is driven by an electromotor, runs on wheels and is actuated by means of a drive control. By means of a switch disposed in the drive control, the motor of the hydraulic pump for the steering assistor is turned on through a time relay (having an activatable delay time) and another relay, and during the rotation of the armature shaft of the electromotor of the vehicle the time relay receives pulses from a pulse generator in the electromotor preventing the activation (initiation) and thus expiration of the delay time, and the pump driving motor for the steering assistor is stopped only after the absence of the pulses while in the neutral position, causing activation of the time relay and then after expiration of the delay time, by means of the drive control and opened switch.

6 Claims, 2 Drawing Figures

DISCONNECTABLE HYDRAULIC STEERING ASSISTOR

The invention relates to a disconnectable hydraulic steering assistor for a vehicle with a hydraulic pump, an electric motor and a relay, which vehicle is driven by an electromotor, runs on wheels and is actuated by means of a drive control.

In a known arrangement of a vehicle with a hydrostatic steering system—e.g. with an electric lift or stacker truck—which steering system is driven by an electric motor, connected with a hydraulic pump, the electric motor serving to drive the pump is turned on and off respectively by means of a switch: this causes a continuous running of the steering pump unit as soon as the switch is activated.

In another known apparatus, the electric motor, as described above, is turned on, but with a not activated switch a time period runs, the switching off of the pump unit being dependent on this time period. By this solution energy is saved. A disadvantage in this case is the shutting off of the steering motor when travelling on an incline, because in case of necessity the steering must be actuated without hydraulic assistance.

The invention is directed to the object of creating a control of the steering pump motor which will operate in a current or power-saving manner and avoid the disadvantages of the known formations of the steering system.

This problem is solved in accordance with the invention by the fact that, by means of a switch (13) disposed in the drive control, the motor of the hydraulic pump for the steering assistor is turned on through a time relay (17) and a relay (16), and upon the rotation of the armature shaft 24 of the drive electromotor 1 of the vehicle, the time relay 17 receives pulses from a pulse generator 12, which pulses prevent the activation (running) of the time delay of the time relay, the pulse generator being built-in the electromotor 1, and the motor (14) for the steering assistor, which motor drives the pump, is stopped only after expiration of the delay time by means of the drive control in the zero or neutral position and open switch (13), after the pulses stop by non-rotation of the armature shaft of the electromotor (1).

An example of the embodiment of the invention is represented in the drawings.

Figure 1:
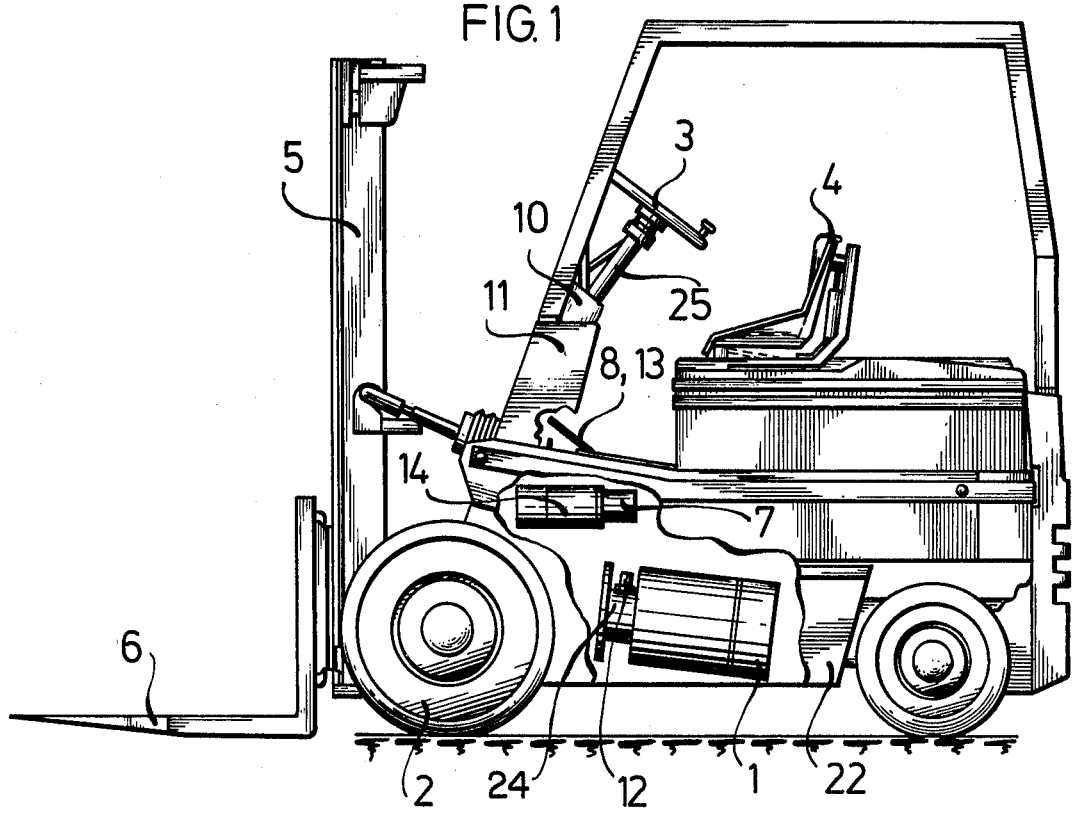
FIG. 1 is a general view of a lift truck showing the arrangement of the initiator of the steering pump unit and of the driving control.
Figure 2:
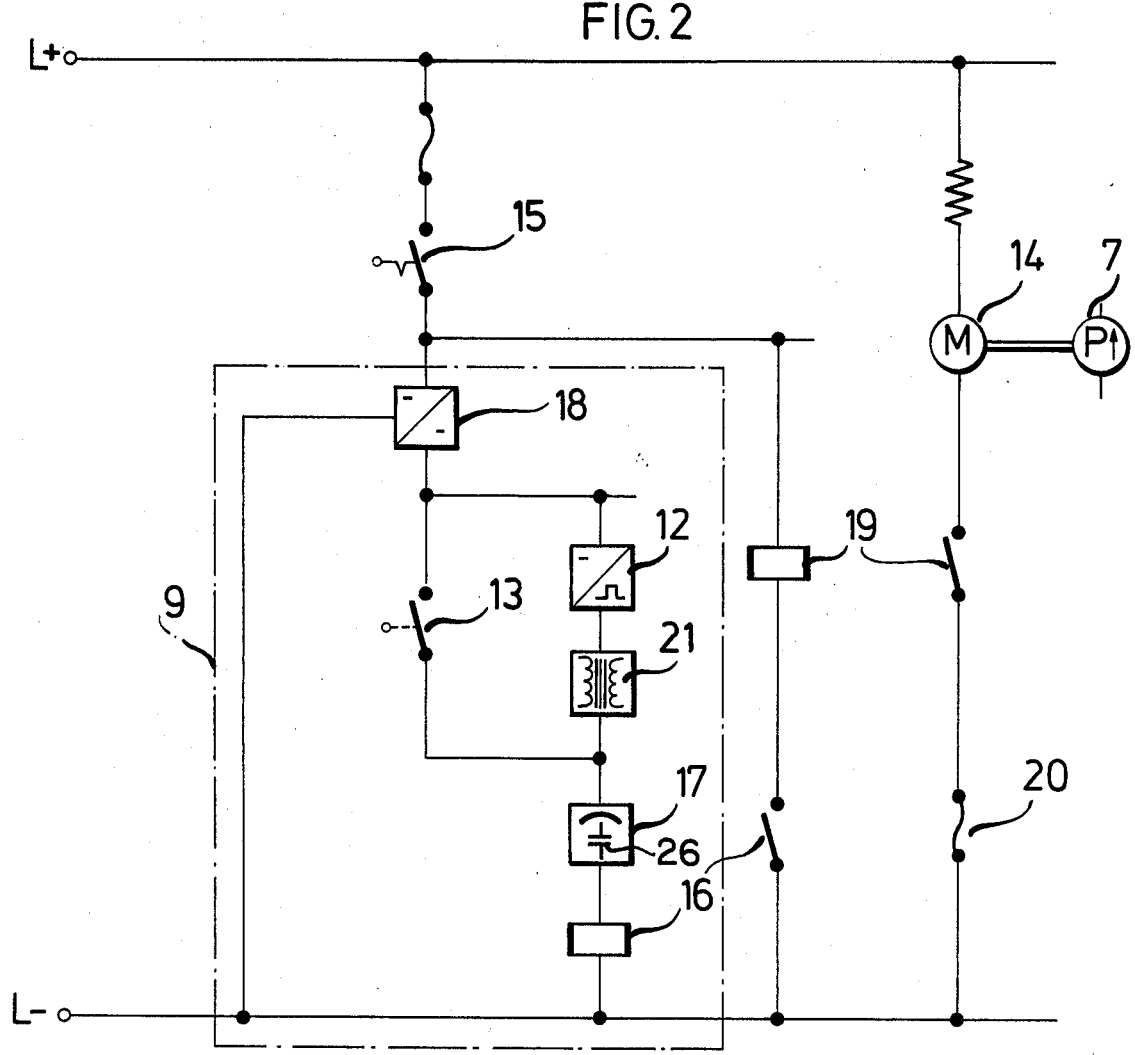
FIG. 2 is a schematic diagram of the electrical circuit.

A lift truck (FIG. 1) is driven by a electromotor 1 and runs by means of the wheels 2 and is steered by the steering wheel 3. The driver operates the vehicle from the driver's seat 4. A lift fork 6 is displaceable vertically on the lift mast or column 5 mounted on the front part of the lift truck. The running speed is steplessly (continuously) controlled by means of a known thyristor control unit 22 connected to the drive electromotor 1 and a drive control 8. The turning on and turning off of the electrical pump unit 14 is performed by means of the control unit 9 which is situated on a printed circuit board 10 in the front structure 11, in connection with switch 13 disposed in the drive control 8 and with a pulse generator 12 built-in the electromotor 1.

The manner of operation is as follows:

With switch 15 closed and switch 13 closed, which switch 13 closes by actuation of the drive control 8, the relay 16 is connected to voltage almost without delay through the time relay 17 the switches 13 and a voltage stabilization unit 18; thus contact 16 closes and connects (energizes) the coil of the power relay 19 to the voltage, so that contact 19 closes and connects the electric motor 14 of pump 7 to the operating voltage through fuse or safety device 20.

Whenever the pump motor 14 continues to run, the time-determining capacitor 26 in the time relay 17 is simultaneously being charged in order to cause the pump motor to run.

If the driving control 8 is no longer actuated, whereupon the switch 13 opens, and the armature shaft in the vehicle driving electromotor 1 does not rotate, the set time delay runs out (expires) and relay 16 becomes without voltage; thus the power relay 19 becomes without voltage by the opening of the contact 16, and the motor of the steering pump 7 is cut off from the operating voltage and stops.

If, however, the pedal of the drive control 8 is stepped down on again so that the rotor or armature shaft 24 in the electromotor 1 rotates, the capacitor 26 in the time relay 17 through the pulse transformer 21 receives pulses from the pulse generator 12, which pulses are provided and cause non-activation of the time delay relay 17 (i.e. the pulses keep the capacitor 26 charged so that the time relay 17 is inactive as a time switching-off means for switching off the relay 16) as long as the armature shaft 24 in the electromotor 1 is rotating, i.e., the motor 14 of the power steering pump 7 runs as long as the electromotor 1 is running. Only after absence or stopping of the pulses from the pulse generator 12 (the motor armature shaft of the electromotor 1 no longer turns by not driving the electromotor 1 and by not other-wise letting the vehicle move so as to cause the armature shaft to turn) with a not actuated pedal of the drive control 8 (i.e. an open switch 13), does the control unit 9 turn off the power steering pump motor 14 after expiration of the delay time of the time relay 17 after its capacitor 26 sufficiently discharges since pulses no longer hold the capacitor 26 charged, as described above.

I claim:

1. In a disconnectable hydraulic steering assistor for a vehicle with a hydraulic pump, an electric motor therefor and a relay operatively connected together, the vehicle being driven by an electromotor, running on wheels and being actuated by means of a drive control means, the improvement comprising a time relay means, operatively connected to said hydraulic pump in turn via the first-mentioned relay and the electric motor, switch means disposed in the drive control means and when closed for turning on the electric motor of the hydraulic pump for the steering assistor via said time relay means and said first-mentioned relay, said time relay means for turning off the electric motor of the hydraulic pump for the steering assistor via the first-mentioned relay when said time relay means is activated after expiration of a time delay thereof, said electromotor has an operative armature shaft, said armature shaft being operatively connected to said electromotor so as to rotate when said vehicle is moving, pulse generator means operatively disposed in said electromotor for transmitting pulses to said time relay means when said armature shaft rotates, said time relay means for being unactivated when said pulses are received by said time relay means for preventing the expiration of the time delay and for keeping the electric motor of the hydraulic pump turned on via said first-mentioned relay, said pulse generator means for stopping said pulses when said armature shaft is stationary, said drive control means in a zero inoperative position thereof for opening said switch means, said time relay means, in said zero inoperative position with said switch open and when said pulses are stopped, for being activated, whereby the electric motor of the hydraulic pump for the steering assistor after the expiration of said delay time is turned off.

2. The steering assistor as set forth in claim 1, wherein said time relay means includes a capacitor.

3. The steering assistor as set forth in claim 2, wherein said switch and said pulse generator are connected in parallel to each other and in series between a voltage source and said time relay means.

4. The steering assistor as set forth in claim 1, wherein
said drive control means is operatively connected to said electromotor for rotating said armature shaft when said drive control means is in a driving position.

5. A method for turning on and off a disconnectable hydraulic steering assistor for a vehicle with a hydraulic pump, an electric motor therefor and a relay operatively connected together, the vehicle being driven by an electromotor, running on wheels and being actuated by means of a drive control, comprising the steps of in an operative driving condition of the vehicle automatically turning on the electric motor of the hydraulic pump for the steering assistor via a time relay and in turn the first-mentioned relay, by energizing the time relay and thereby the first-mentioned relay, in an inoperative driving condition of the vehicle automatically sending pulses to the time relay upon rotation of the electromotor of the vehicle by movement of the vehicle, by means of a pulse generator such that the electric motor of the hydraulic pump is turned on, and preventing activation of the time relay and turning off of the electric motor of the hydraulic pump by the pulses sent to the time relay, in another inoperative driving condition of the vehicle with the vehicle stationary, stopping the electric motor of the hydraulic pump for the steering assistor by activating the time relay and after expiration of a delay time thereof, by first stopping the pulses by non-rotation of the electromotor, at neutral position of the drive control.

6. The method as set forth in claim 5, wherein
in the operative driving condition performing the energizing of the time relay by closing a switch connecting direct voltage to the time relay, and
in the inoperative driving condition opening the switch.

* * * * *